Feb. 28, 1950     C. E. BENNETT ET AL     2,498,834
APPARATUS FOR INSTALLING ELECTRIC POWER CABLES
Filed Jan. 9, 1948     2 Sheets-Sheet 1
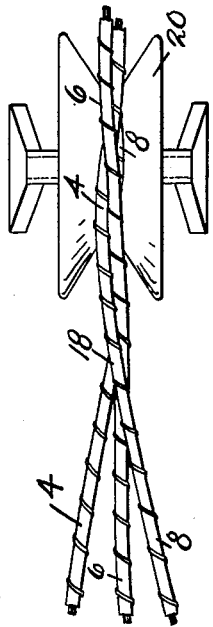
Fig. 1
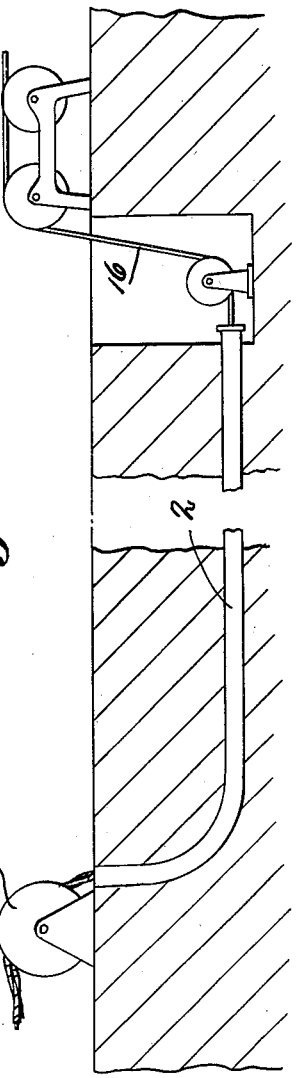
Fig. 2
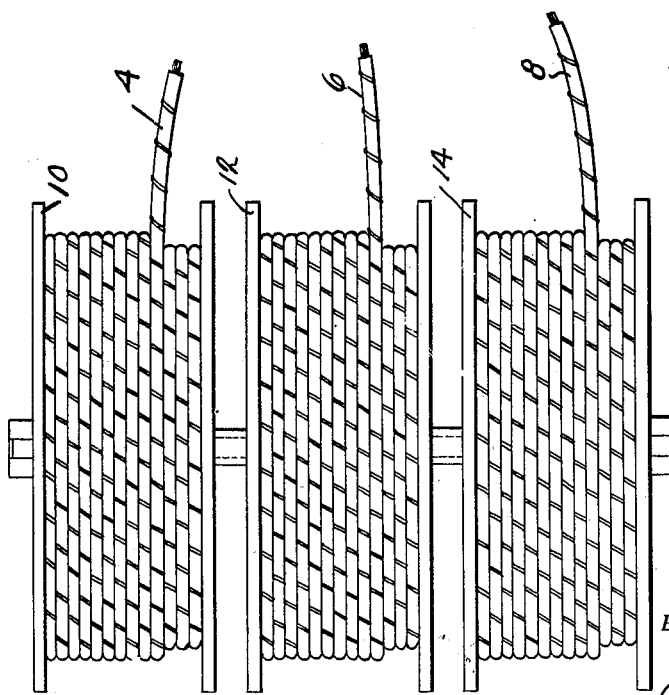
INVENTORS.
Charles E. Bennett
BY Paul V. White
James G. Bethell Feb. 28, 1950   C. E. BENNETT ET AL   2,498,834
APPARATUS FOR INSTALLING ELECTRIC POWER CABLES
Filed Jan. 9, 1948   2 Sheets-Sheet 2
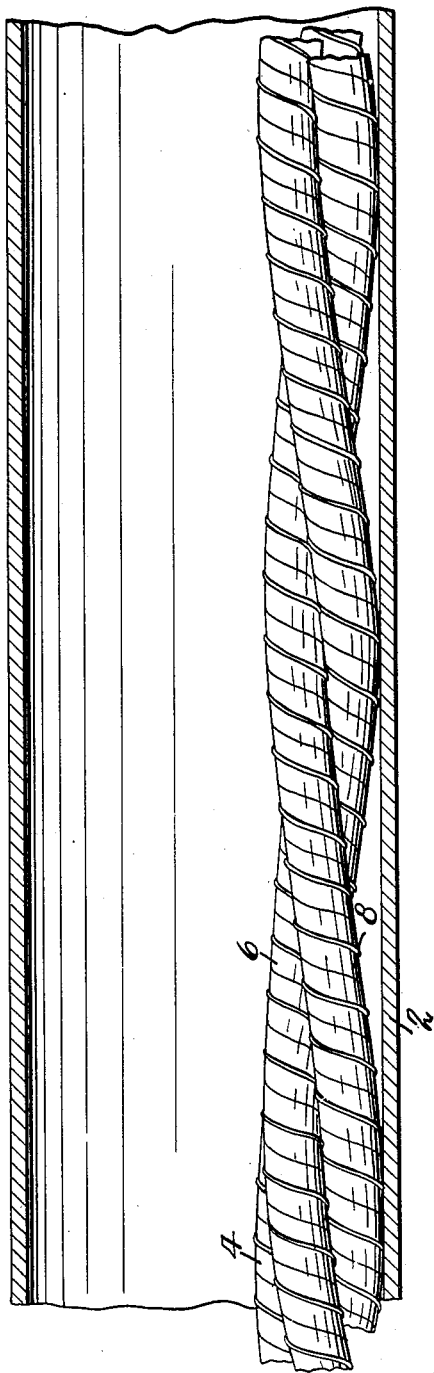
INVENTORS
Charles E. Bennett
Paul V. White
BY
James G. Buchell Patented Feb. 28, 1950

2,498,834

UNITED STATES PATENT OFFICE 2,498,834

APPARATUS FOR INSTALLING ELECTRIC POWER CABLES

Charles E. Bennett, Ridgewood, and Paul V. White, Waldwick, N. J., assignors to The Okonite-Callender Cable Company, Incorporated, Paterson, N. J., a corporation of New Jersey Application January 9, 1948, Serial No. 1,448

1 Claim. (Cl. 175—37.6)

Our invention relates to electric power cable systems and to the method of and apparatus for installing the same.

More specifically our invention relates to electric power cable systems wherein several cable conductors, each individually insulated, are enclosed in a pipe line which is buried in the ground, and kept filled with insulating fluid under high pressure.

In installing such systems the conventional practice is to lay the pipe line in the trench and then before back-filling to draw the conductors thereinto, the inside diameter of pipe line being sufficiently large for this purpose. As above mentioned the pipe line is finally filled with insulating fluid maintained at high pressure such as two hundred and twenty five pounds per square inch, for example.

The conductors, in commercial practice are simply drawn into the pipe line and allowed to assume whatever position they may take in the pipe line. As a result they extend substantially parallel to the pipe line, and with a three conductor cable, two of the conductors will usually lie in the bottom of the pipe line while the third conductor lies upon the other two, roughly a triangular cross section.

The pipe line is of metal, and being buried directly in the earth is grounded continuously its full length. The magnetic effect because of proximity of the conductors to the pipe line itself causes different impedances of the conductors. In order to balance the impedances we twist the conductors together as they are being drawn into the pipe line, so that they will have about equal exposure throughout their length.

More specifically we twist the conductors together with a long pitch twist at their leading end and then advance the conductors over a V-pulley and thence into the pipe line.

We have found in practice that the conductor which happens to lie in the bottom of the pulley as the conductors are being drawn in will, because of the initial twist imparted to the conductors, cause the three conductors to continue to twist together as they move over the pulley. This twist is very gradual, but upon the termination of the drawing-in process, we find that the conductors are twisted together throughout the length of the pipe line and lie in the bottom of the pipe line out of parallel with the pipe line.

In the accompanying drawings

Fig. 1 is a fragmentary plan view showing the method of installing the cable;

Fig. 2 is a fragmentary part sectional elevational view showing the pipe line in the trench and the cable conductors being drawn thereinto and;

Fig. 3 is a part sectional and part elevational view illustrating the manner in which the conductors lie in the pipe line.

Referring to the drawings in detail, 2 designates the pipe line of the type of cable system with which our invention is concerned. This pipe line as above explained is laid in the ground and the cable conductors are drawn thereinto.

The cable conductors are designated 4, 6 and 8. These conductors are individually insulated with paper tape for example, and are drawn into the pipe line 2. Under present practice it is customary to draw these conductors into the pipe line 2 and let them lie as they will in the bottom of the pipe line, with the result that they usually lie with two of the conductors in continuous contact with the pipe line, and the other out of contact with the pipe line.

We depart from this practice in that we twist the conductors together as they are being drawn in. In effect we rotate the conductors with respect to the pipe line so that they will have about equal exposure throughout their length.

With reference to Figs. 1 and 2, 10, 12 and 14 designate the cable conductor reels. Each conductor is equipped with a pulling eye (not shown) for the attachment of wire rope 16 attached to a suitable windlass (not shown).

In starting the drawing-in operation the rope 16 is threaded through the pipe line and attached to the pulling eyes of the conductors. The leading ends of the conductors initially are slightly twisted together as we have indicated at 18, and then the conductors are drawn over a V-pulley 20. In passing over this pulley one of the conductors lies in the bottom of the V and will tend to follow it, and inasmuch as the conductors are twisted together back of the pulley the three conductors as they pass over the pulley 18 and into the pipe line will be caused to rotate as a unit. The reels 10, 12 and 14 from which the conductors are being drawn merely rotate on their axes, so that the conductors as they move forward are rotated with respect to the pipe line to twist the conductors together. The result of this operation is illustrated in Fig. 3, and it will be seen from this figure that the conductors nowhere extend parallel to the pipe line, and that the conductors have about equal exposure throughout their length.

As above mentioned, the reels 10, 12 and 14 have no movement other than a rotary one, but it has been found in practice that when the twisting action on the conductors reaches a certain maximum then the conductors will slip in the V of the pulley 20 so that throughout a portion of the drawing-in process the conductor 4 may follow the V then the assembly may slip slightly so that conductor 6 or conductor 8 will follow the V. In this way twisting of the conductors from the pulley 20 back to the reels 10, 12 and 14 is avoided.

We have found in practice that the twist of the conductors within the pipe line is substantially uniform so that the assembly has the appearance illustrated in Fig. 3.

It will be seen from all of the foregoing that our invention provides a method and apparatus for installing multi-conductor cables wherein the conductors are rotated with respect to the pipe line as they are drawn in, to twist the conductors together, and so that the conductors will have about equal exposure throughout their length, thereby substantially to balance the conductor impedances.

Our construction provides another advantage in that by having the conductors twisted together as they lie in the pipe line, strain on the joints of the system from "snaking" of the conductors due to conductor expansion from cable operation is reduced to a minimum.

It is to be understood that changes may be made in the apparatus illustrated within the purview of our invention.

This application is a division of our co-pending application, Serial No. 740,358, filed April 9, 1947.

What we claim is:

In combination, a plurality of individually insulated electric cable conductors having their leading ends twisted together, a pipe line into which the conductors are to be installed simultaneously, a let-off or supply reel for each conductor disposed adjacent one end of the pipe line, a pulling windlass adjacent the opposite end of the pipe line, a pulling cable threaded through the pipe line and having one end attached to the windlass and its other end attached to the said leading end of the conductors, a V-pulley intermediate the twisted-together leading end of the conductors and the adjacent end of the pipe line and so positioned that the conductors must ride in the periphery of the pulley as they are drawn into the pipe line by the windlass so that as the twisted together leading ends of the conductors engage the pulley the conductors will be caused to rotate as a unit throughout the pulling-in operation.

CHARLES E. BENNETT.
PAUL V. WHITE.

REFERENCES CITED

The following references are of record in the file of this patent:

UNITED STATES PATENTS

| Number | Name | Date |
| --- | --- | --- |
| 267,597 | Sawyer | Nov. 14, 1882 |
| 644,884 | Wrigley | Mar. 6, 1900 |
| 1,735,301 | Short | Nov. 12, 1929 |
| 1,988,586 | Deacon | Jan. 26, 1935 |

FOREIGN PATENTS

| Number | Country | Date |
| --- | --- | --- |
| 451,595 | Germany | Oct. 22, 1927 |
| 555,711 | Germany | July 26, 1932 |